United States Patent
Jiang et al.

(10) Patent No.: US 10,477,527 B2
(45) Date of Patent: Nov. 12, 2019

(54) SEMI-PERSISTENT SCHEDULING MECHANISMS FOR VEHICLE-TO-VEHICLE COMMUNICATION

(71) Applicant: QUALCOMM Incorporated, San Diego, CA (US)

(72) Inventors: Libin Jiang, Bridgewater, NJ (US); Sudhir Kumar Baghel, Bridgewater, NJ (US); Shailesh Patil, Raritan, NJ (US); Saurabha Rangrao Tavildar, Jersey City, NJ (US); Kapil Gulati, Franklin Park, NJ (US)

(73) Assignee: Qualcomm Incorporated, San Diego, CA (US)

( * ) Notice: Subject to any disclaimer, the term of this patent is extended or adjusted under 35 U.S.C. 154(b) by 171 days.

(21) Appl. No.: 15/177,186

(22) Filed: Jun. 8, 2016

(65) Prior Publication Data

US 2017/0019887 A1    Jan. 19, 2017

Related U.S. Application Data

(60) Provisional application No. 62/192,178, filed on Jul. 14, 2015.

(51) Int. Cl.
*H04W 72/04* (2009.01)
*H04W 72/12* (2009.01)
*H04W 72/14* (2009.01)
*H04W 84/00* (2009.01)

(52) U.S. Cl.
CPC ..... *H04W 72/042* (2013.01); *H04W 72/0406* (2013.01); *H04W 72/1263* (2013.01); *H04W 72/14* (2013.01); *H04W 84/005* (2013.01)

(58) Field of Classification Search
CPC .......... H04W 72/042; H04W 72/0406; H04W 72/1263; H04W 72/14; H04W 84/005
See application file for complete search history.

(56) References Cited

U.S. PATENT DOCUMENTS

| | | |
|---|---|---|
| 2013/0308549 A1 | 11/2013 | Madan et al. |
| 2014/0023008 A1 | 1/2014 | Ahn et al. |

(Continued)

OTHER PUBLICATIONS

International Search Report and Written Opinion—PCT/US2016/036725—ISA/EPO—Sep. 21, 2016.

(Continued)

*Primary Examiner* — Luat Phung
(74) *Attorney, Agent, or Firm* — Arent Fox, LLP and Qualcomm, Incorporated

(57) ABSTRACT

The present disclosure enables the assignment of multiple semi-persistent resource assignments at the same time for use in V2V communications. In an aspect of the disclosure, a method, a computer-readable medium, and an apparatus are provided. The apparatus may be a UE (e.g., a vehicle). The UE may determine at least one resource pattern required for V2V communications. The UE may also send assistance information for the at least one resource pattern to a base station. Further, the UE may receive, from the base station, a response associated with the at least one resource pattern. In an aspect, the response may include an index of approved resource patterns. Further still, the UE may receive, from the base station, an activation grant for a resource assignment for the at least one resource pattern. In an aspect, activation grant may include the index of approved resource patterns being activated.

24 Claims, 11 Drawing Sheets

(56) References Cited

U.S. PATENT DOCUMENTS

| | | | |
|---|---|---|---|
| 2015/0215903 A1* | 7/2015 | Zhao | H04W 72/04 370/329 |
| 2015/0271800 A1* | 9/2015 | Panteleev | H04W 72/042 370/329 |
| 2016/0295624 A1* | 10/2016 | Novlan | H04W 72/02 |
| 2017/0079085 A1* | 3/2017 | Yang | H04W 4/005 |
| 2017/0118621 A1* | 4/2017 | Sorrentino | H04W 8/005 |

OTHER PUBLICATIONS

Qualcomm Incorporated: "Resource allocation for Mode 1 D2D broadcast communication", 3GPP Draft; R2-142589, 3rd Generation Partnership Project (3GPP), Mobile Competence Centre ; 650, Route Des Lucioles ; F-06921 Sophia-Antipolis Cedex; France, vol. RAN WG2, No. Seoul, South Korea; May 19, 2014-May 23, 2014, May 18, 2014 (May 18, 2014), XP050793681, 7 pages. Retrieved from the Internet: URL: http://www.3gpp.org/ftp/Meetings_3GPP_SYNC/RAN2/Docs/ [retrieved on May 18, 2014].

ZTE: "D2D Communication Resource Mode Configuration", 3GPP Draft; R2-142146, 3RD Generation Partnership Project (3GPP), Mobile Competence Centre ; 650, Route Des Lucioles ; F-06921 Sophia-Antipolis Cedex ; FR, vol. RAN WG2, No. Seoul, South Korea; May 19, 2014-May 23, 2014, May 18, 2014 (May 18, 2014), XP050793364, 5 pages. Retrieved from the Internet: URL: http://www.3gpp.org/ftp/Meetings_3GPP_SYNC/RAN2/Docs, [retrieved on May 18, 2014].

* cited by examiner

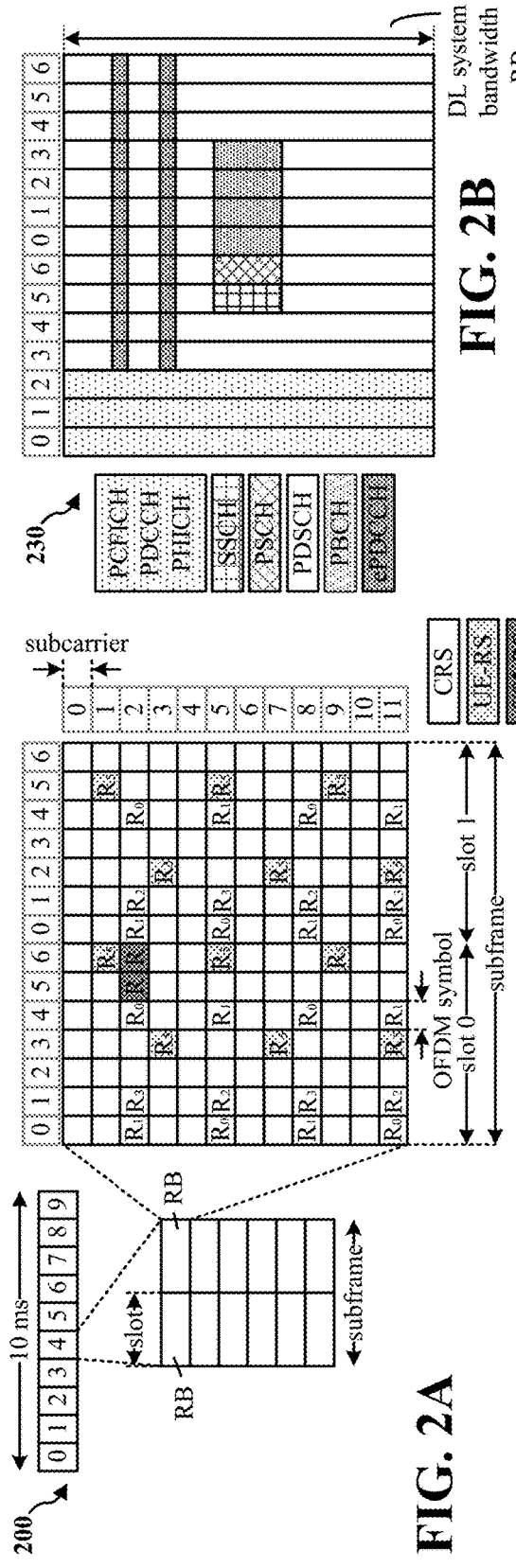
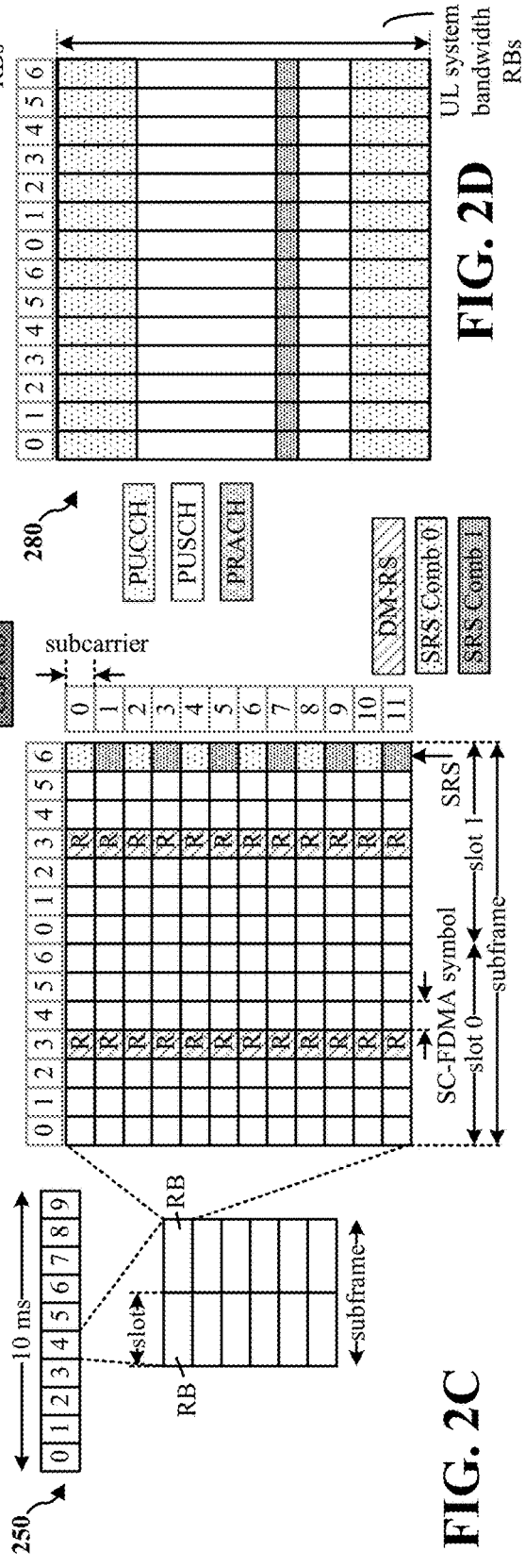
FIG. 2A  FIG. 2B  FIG. 2C  FIG. 2D

SEMI-PERSISTENT SCHEDULING MECHANISMS FOR VEHICLE-TO-VEHICLE COMMUNICATION

CROSS-REFERENCE TO RELATED APPLICATION(S)

This application claims the benefit of U.S. Provisional Application Ser. No. 62/192,178, entitled "SEMI-PERSISTENT SCHEDULING MECHANISMS FOR VEHICLE-TO-VEHICLE COMMUNICATION" and filed on Jul. 14, 2015, which is expressly incorporated by reference herein in its entirety.

BACKGROUND

Field

The present disclosure relates generally to communication systems, and more particularly, to a semi-persistent scheduling mechanism for vehicle-to-vehicle (V2V) communications.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

Unlike LTE communications, for V2V communications, a vehicle equipped with a wireless device (e.g., an autonomous vehicle, a non-autonomous vehicle, or a semi-autonomous vehicle) may need multiple semi-persistent resource assignments at the same time. Thus, there is an unmet need for a semi-persistent scheduling mechanism for V2V communications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An autonomous vehicle, also known as a driverless car or a self-driving car, is an automated vehicle that may be capable of fulfilling the main transportation capabilities of a traditional car. Autonomous vehicles may be able to sense their surroundings using techniques such as radar, lidar, a global positioning system (GPS), computer vision, and/or V2V communications. The control system of an autonomous vehicle may interpret sensory information and data obtained using V2V communication to identify appropriate navigation paths, as well as obstacles and/or relevant signage. In addition, autonomous vehicles may be capable of updating maps based on sensory information and/or data obtained using V2V communications. Updating maps based on sensory information and/or data obtained using V2V communications may allow the vehicles to keep track of position information even when conditions change, such as when vehicles enter or exit the roadway.

Unlike legacy LTE communications, for V2V communications, a vehicle equipped with a wireless device (e.g., an autonomous vehicle, a non-autonomous vehicle, or a semi-autonomous vehicle) may need multiple semi-persistent resource assignments at the same time. For example, the vehicle may need different semi-persistent resource assignments that each correspond to a specific type of message the vehicle periodically broadcasts to other vehicles on the road. Also, each semi-persistent resource assignment may need to satisfy a different set of requirements in terms of period, size, target range, transmission latency, etc. Thus, there is an unmet need for a semi-persistent scheduling mechanism for V2V communications.

The present disclosure provides a solution to the problem by enabling a base station to determines resource(s) assigned to each semi-persistent scheduling (SPS) request received from a user equipment (UE) (e.g., a vehicle) after considering the various requirements specified in the SPS request(s). The SPS request may be for a resource assignment for V2V communications. The base station may signal the resource assignment(s) to the UE. For example, the resource assignment may include a combination of a radio resource control (RRC) grant and a downlink control information (DCI) grant. In an aspect, the RRC grant may specify the resource assignment duration for multiple SPS requests and the DCI grant may activate/de-activate the resource assignment for multiple SPS requests. In this way, the present disclosure enables the assignment of multiple semi-persistent resource assignments at the same time for use in V2V communications.

In an aspect of the disclosure, a method, a computer-readable medium, and an apparatus are provided. The apparatus may be a UE (e.g., a vehicle). The UE may determine at least one resource pattern required for V2V communications. The UE may also send assistance information for the at least one resource pattern to a base station. Further, the UE may receive, from the base station, a response associated with the at least one resource pattern. In an aspect, the response may include an index of approved resource patterns. Further still, the UE may receive, from the base station, an activation grant for a resource assignment for the at least one resource pattern. In an aspect, activation grant may include the index of approved resource patterns being activated.

In another aspect, the apparatus may be a base station. The base station may receive, from a UE, assistance information associated with at least one resource pattern. In an aspect, the assistance information may include information associated with the at least one resource pattern required for V2V communications. In addition, the base station may transmit, to the UE, a response associated with the at least one resource pattern. In an aspect, the response may include an index of approved resource patterns. The base station may also transmit, to the UE, an activation grant for a resource assignment for the at least one resource pattern. In an aspect, the activation grant may include the index of approved resource patterns.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating LTE examples of a DL frame structure, DL channels within the DL frame structure, an UL frame structure, and UL channels within the UL frame structure, respectively.

DETAILED DESCRIPTION

Figure 1:
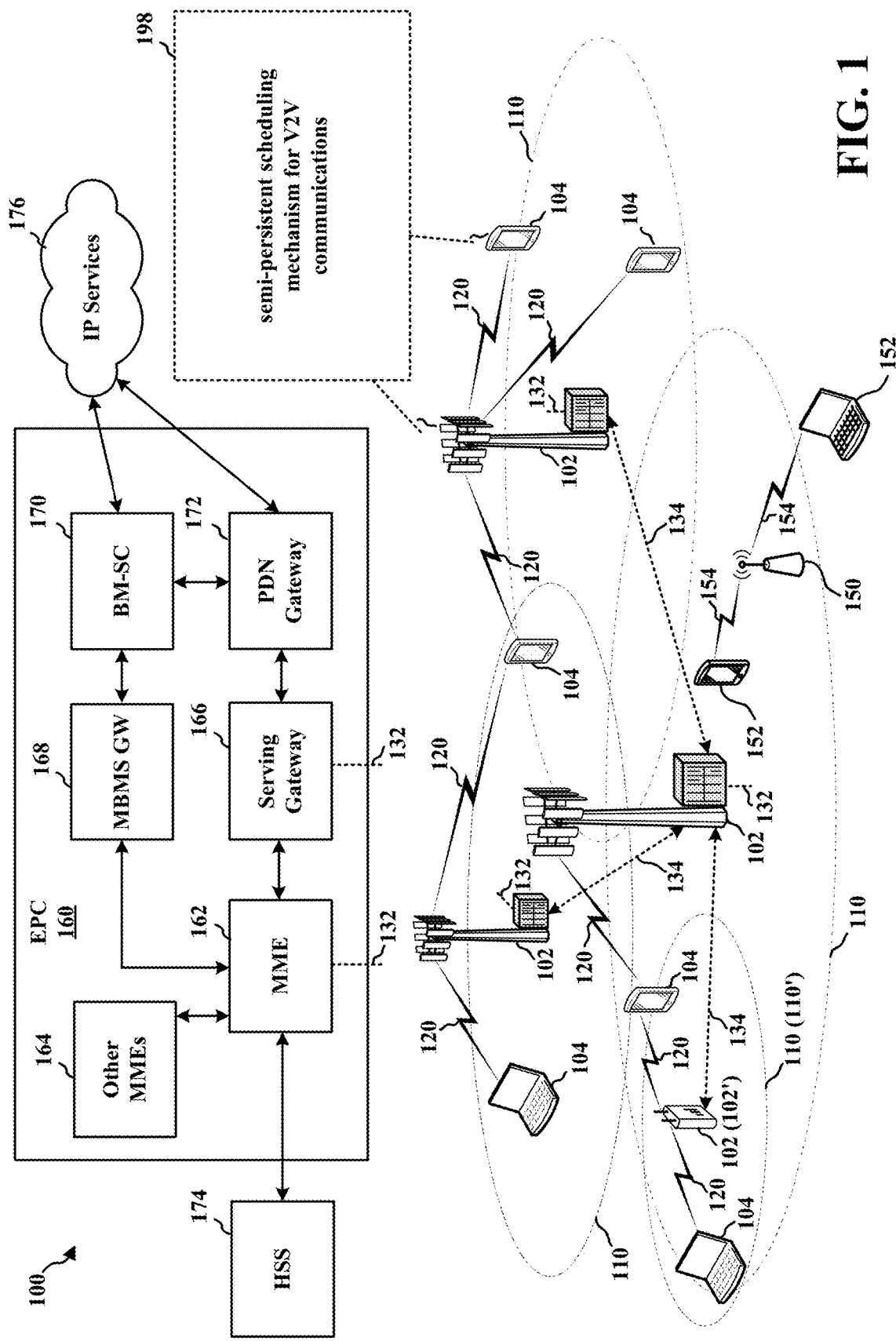
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile

Telecommunications System (UMTS) Terrestrial Radio Access Network (E-UTRAN)) interface with the EPC 160 through backhaul links 132 (e.g., 51 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the eNB 102 may be configured to enable a semi-persistent scheduling mechanism for V2V communications (198).

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as R5), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries DCI within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (HACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests that include UE assistance information, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
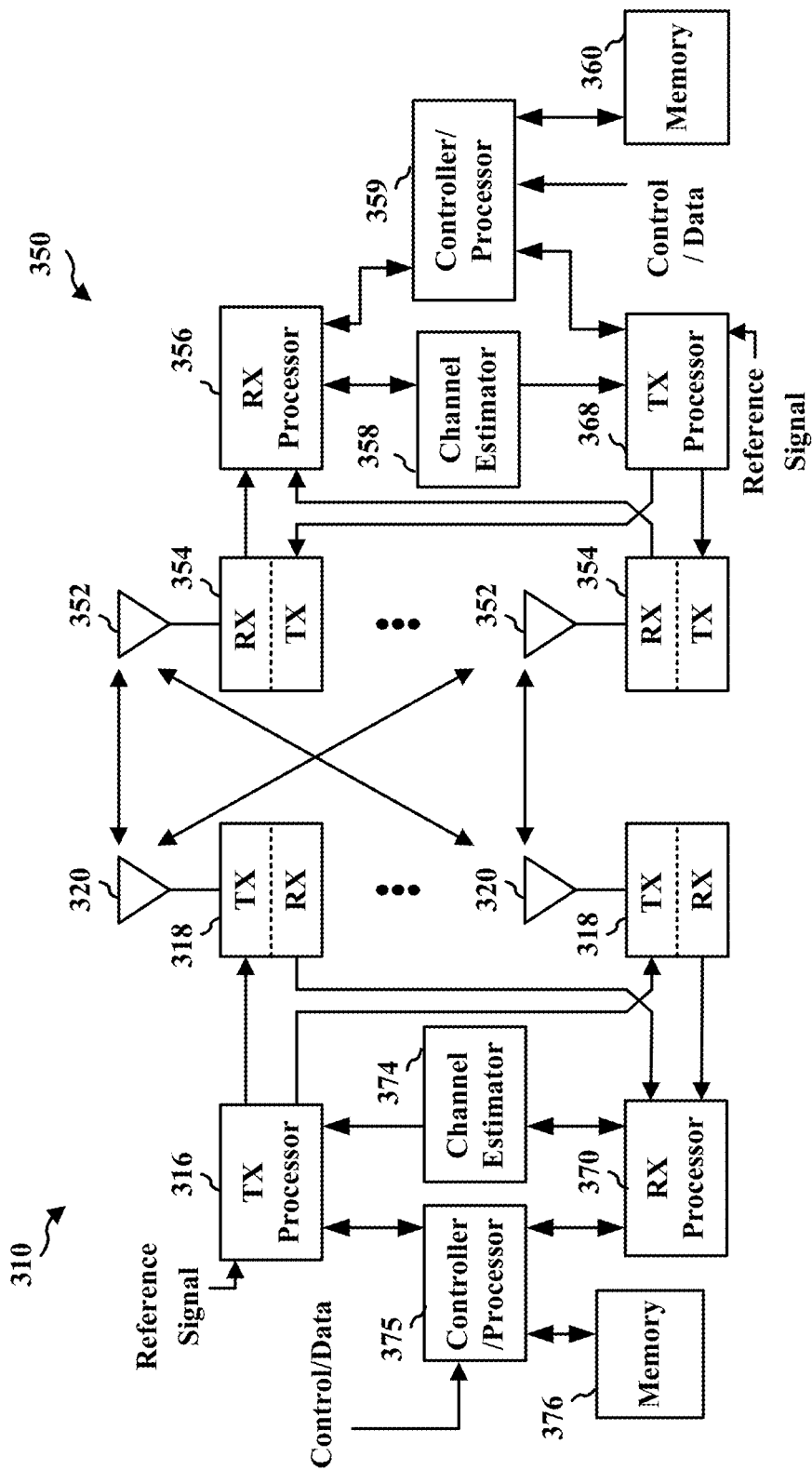
FIG. 3 is a diagram illustrating an example of an evolved Node B (eNB) and UE in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a RRC layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demuliplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
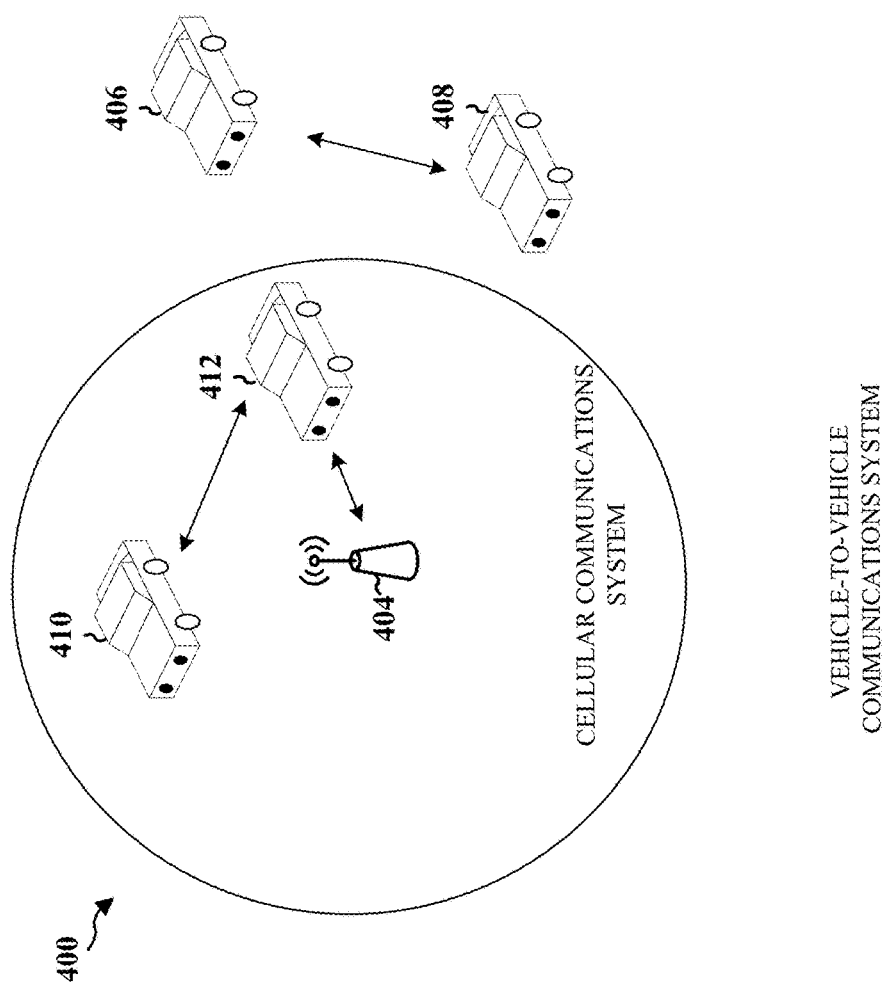
FIG. 4 is a diagram of an example V2V communications system.

FIG. 4 is a diagram of a device-to-device V2V communications system 400. The V2V communications system 400 includes a plurality of vehicles 406, 408, 410, 412 that are each equipped with a wireless device. The V2V communications system 400 may overlap with a cellular communications system, such as for example, a WWAN. Some of the vehicles 406, 408, 410, 412 may communicate together in V2V communication using the DL/UL WWAN spectrum, some may communicate with the base station 404, and some may do both.

For example, as shown in FIG. 4, the vehicles 406, 408 are in V2V communication and the vehicles 410, 412 are in V2V communication. The V2V communication may be through one or more sidelink channels, such as a physical sidelink broadcast channel (PSBCH), a physical sidelink discovery channel (PSDCH), a physical sidelink shared channel (PSSCH), and a physical sidelink control channel (PSCCH). The vehicle 412 is also communicating with the base station 404.

The exemplary methods and apparatuses discussed infra are applicable to any of a variety of wireless V2V communications systems, such as for example, a wireless V2V communication system based on LTE, V2V, vehicle-to-device (V2X), FlashLinQ, VLinQ, WiMedia, Bluetooth, ZigBee, or Wi-Fi based on the IEEE 802.11 standard. To simplify the discussion, the exemplary methods and apparatus may be discussed within the context of V2V. However, one of ordinary skill in the art would understand that the exemplary methods and apparatuses are applicable more generally to a variety of other wireless V2V communication systems.

An autonomous vehicle, also known as a driverless car or a self-driving car, is an automated vehicle that may be capable of fulfilling the main transportation capabilities of a traditional car. Autonomous vehicles may be able to sense their surroundings using techniques such as radar, lidar, GPS, computer vision, and/or V2V communications. The control system of an autonomous vehicle may interpret sensory information and data obtained using V2V communication to identify appropriate navigation paths, as well as obstacles and/or relevant signage. In addition, autonomous vehicles may be capable of updating maps based on sensory information and/or data obtained using V2V communications. Updating maps based on sensory information and/or data obtained using V2V communications may allow the vehicles to keep track of position information even when conditions change, such as when vehicles enter or exit the roadway.

Unlike legacy LTE communications, for V2V communications, a vehicle equipped with a wireless device (e.g., an autonomous vehicle, a non-autonomous vehicle, or a semi-autonomous vehicle) may need multiple semi-persistent resource assignments at the same time. For example, the vehicle may need different semi-persistent resource assignments that each correspond to a specific type of message the vehicle periodically broadcasts to other vehicles on the road. Also, each semi-persistent resource assignment may need to satisfy a different set of requirements in terms of period, size, target range, transmission latency, etc.

The present disclosure provides a solution to the problem by enabling a base station to determines resource(s) assigned to each semi-persistent scheduling (SPS) request received from a UE (e.g., a vehicle) after considering the various requirements specified in the SPS request(s). The SPS request may be for a resource assignment for V2V communications. The base station may signal the resource assignment(s) to the UE. For example, the resource assignment may include a combination of a radio resource control (RRC) grant and a downlink control information (DCI) grant. In an aspect, the RRC grant may specify the resource assignment duration for multiple SPS requests and the DCI grant may activate/de-activate the resource assignment for multiple SPS requests. In this way, the present disclosure enables the assignment of multiple semi-persistent resource assignments at the same time for use in V2V communications.

Figure 5:
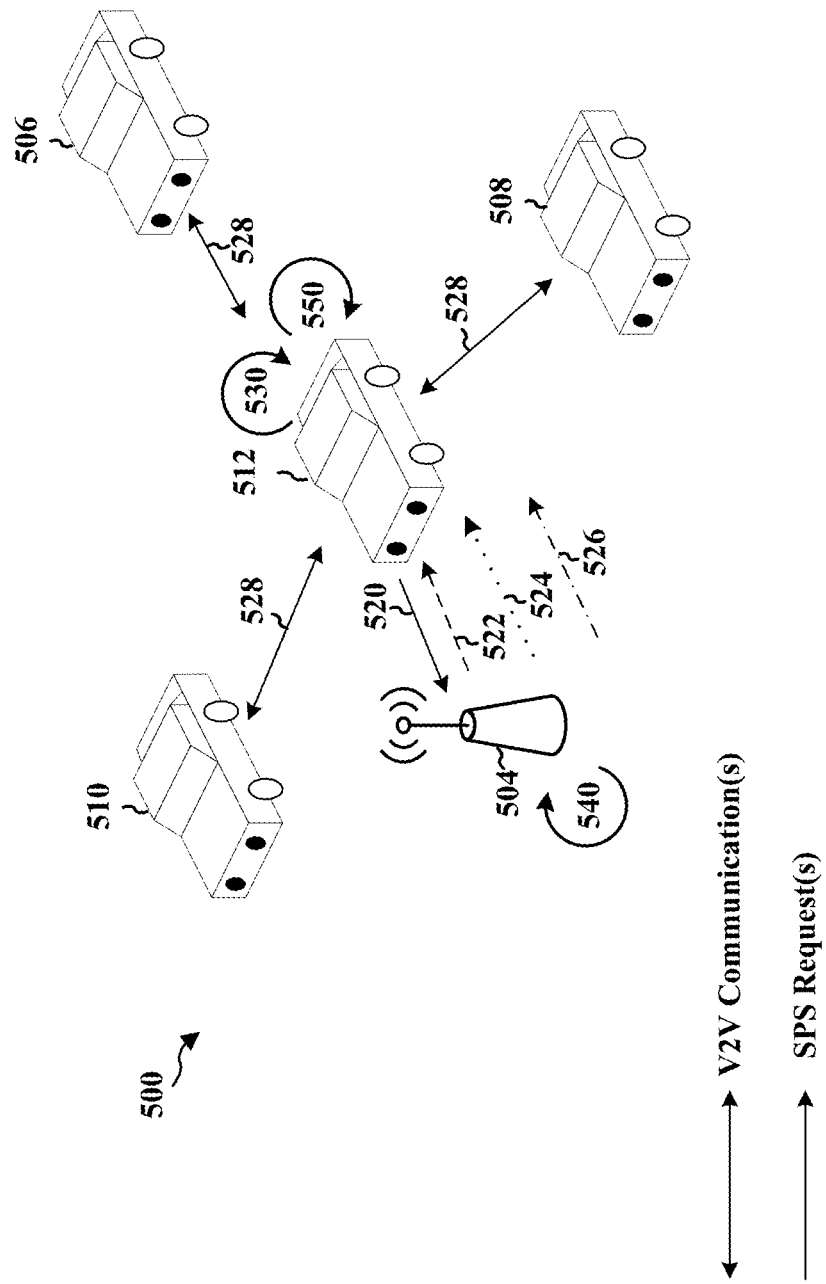
FIG. 5 is a diagram of an exemplary V2V communications system in accordance with one aspect of the disclosure.

FIG. 5 is a diagram of an exemplary V2V communications system 500 in accordance with one aspect of the disclosure. The V2V communications system 500 includes a plurality of vehicles 506, 508, 510, 512. For example, as shown in FIG. 5, before communicating with vehicles 506, 508, 510 within a general vicinity of vehicle 512, vehicle 512 may determine 530 at least one resource pattern for one or more V2V communications 528. The resource pattern for the V2V communications 528 may be associate with the Uu interface (e.g., LTE-Uu interface) and/or the PC5 interface (e.g., sidelink V2V interface).

The vehicle 512 may send an SPS request 520 that includes UE assistance information to the base station 504 in an attempt to obtain a resource assignment for at least one resource pattern for use in V2V communications. The UE assistance information may include information associated with a periodicity and/or timing for the at least one resource pattern. In an exemplary embodiment, the SPS request 520 may be used to obtain an SPS resource assignment. For example, the SPS request 520 and/or UE assistance information may include multiple fields that specify (e.g., to the base station 504) a requested resource period for the SPS resource assignment, a size of the V2V communication 528 to be broadcast using the SPS resource assignment, the power with which the V2V communication 528 will be broadcast using the SPS resource assignment, the type of V2V communication 528 being broadcast using the SPS resource assignment, a latency between when vehicle 512 intends to broadcast V2V communications 528 and when vehicle 512 is able to broadcast V2V communications 528 using the assigned SPS resource, and/or a resource offset needed for the SPS resource assignment of System Frame Number (SFN). In an aspect, the resource offset may allow for lower transmission latency between when the vehicle 512 intends to broadcast the V2V communication 528 and when vehicle 512 is able to broadcast the V2V communication 528. In an aspect, the SPS request 520 may be sent to the base station 504 over a control element in a MAC header or an RRC request message.

In an exemplary embodiment, when vehicle 512 needs to broadcast different types of V2V communications 528 with different resource requirements, a single SPS request 520 that includes UE assistance information associated with each of the different resource requirements may be transmitted to the base station 504. In this exemplary embodiment, the single SPS request 520 and/or UE assistance information may contain a list of the different V2V communications 528 and various fields described supra for each of the different V2V communications 528. Alternatively, a distinct SPS request may be transmitted by vehicle 512 for each of the different V2V communications 528.

Still referring to FIG. 5, after receiving the SPS request 520 from vehicle 512, the base station 504 may determine 540 the resource assignment for the SPS request(s) 520 after considering the various requirements specified in the fields of SPS request(s) 520 and/or the UE assistance information. In an aspect, base station 504 may configure multiple SPS configurations (e.g., a different SPS configuration for each SPS request 520) for the vehicle 512 based on the UE assistance information. For example, when the base station 504 activates multiple SPS configurations, the SPS configurations and UE assistance information may be linked to one or more radio bearers. Each of the multiple SPS-configurations may include different parameters (e.g., MCS and/or periodicity). For example, a specific SPS-configuration-specific MCS (e.g., if MCS is part of the SPS-configuration) and SPS-configuration-specific periodicity may be configured by the base station 504 using the UE assistance information. Alternatively, the base station 504 may activate a single SPS configuration at a time (e.g., as per LTE).

The base station 504 may dynamically activate and/or deactivate (e.g., trigger) the different SPS-configurations using the ePDCCH. In addition, the base station 504 may signal (e.g., in a DCI grant) to the vehicle 512 which SPS configuration(s) are being activated and/or deactivated. Furthermore, the base station 504 may signal an UL SPS-configuration the vehicle 512 may use for V2V communications 528.

If the base station 504 determines 530 that one or more resource pattern(s) are available for assignment for one or more of the SPS request(s) 520, the base station 504 may transmit a response 522 that includes one or more of an index of the approved SPS requests and/or resource patterns, a radio network temporary identifier (RNTI), and/or a resource period for each of the approved SPS request(s) 520. For example, the RNTI may be a V2V SPS RNTI that is specific to the SPS request(s) 520 transmitted by vehicle 512.

In an aspect, response 522 may be transmitted by the base station 504 in an RRC grant. The RRC grant may indicate a periodicity for each SPS request 520 (e.g., with the corresponding index reference associated with each SPS request) and a duration the resource assignment is available once SPS resource allocation is activated.

Referring again to FIG. 5, to activate the SPS resource allocation and/or SPS configuration(s), the base station 504 may transmit an activation grant 524 to vehicle 512. For example, the activation grant 524 may be transmitted as a DCI grant in the PDCCH. In an aspect, the DCI grant may be a DCI Format 5 (i.e., DCI5) grant that is scrambled with the V2V SPS RNTI. The V2V SPS RNTI may be used by vehicle 512 to distinguish the activation grant 524 (e.g., the DCI grant) from other types of grants. In an aspect, the activation grant 524 may include an index of the SPS requests 520 that are being activated. The DCI grant may indicate a duration the resource pattern will be made available once SPS is activated and/or a periodicity associated with the SPS resource allocation.

Once the activation grant 524 is received, vehicle 512 may process 550 the DCI grant using the RNTI received in the response 522. In an exemplary embodiment, vehicle 512 may process 550 the DCI grant by descrambling the DCI grant using the V2V SPS RNTI received in the RRC grant. Once the DCI grant is descrambled vehicle 512 may begin broadcasting V2V communications 528 based on the resource assignment.

The base station 504 may deactivate the SPS resource allocation and/or SPS configuration(s) by sending a deactivation grant 526 to vehicle 512. In an exemplary embodiment, the deactivation grant 526 may be transmitted as a DCI grant. The deactivation grant 526 may be scrambled with the V2V SPS RNTI to be distinguished by vehicle 512 from other types of grants. In an aspect, the deactivation grant 526 may include an index of the SPS requests that are being deactivated. Vehicle 512 may process 550 the deactivation grant 526 using the V2V SPS RNTI received in the RRC grant, and stop broadcasting the V2V communications 528 when the deactivation grant 526 is received. In this way, the present disclosure enables the assignment of multiple semi-persistent resource assignments at the same time for use in V2V communications.

Figure 6:
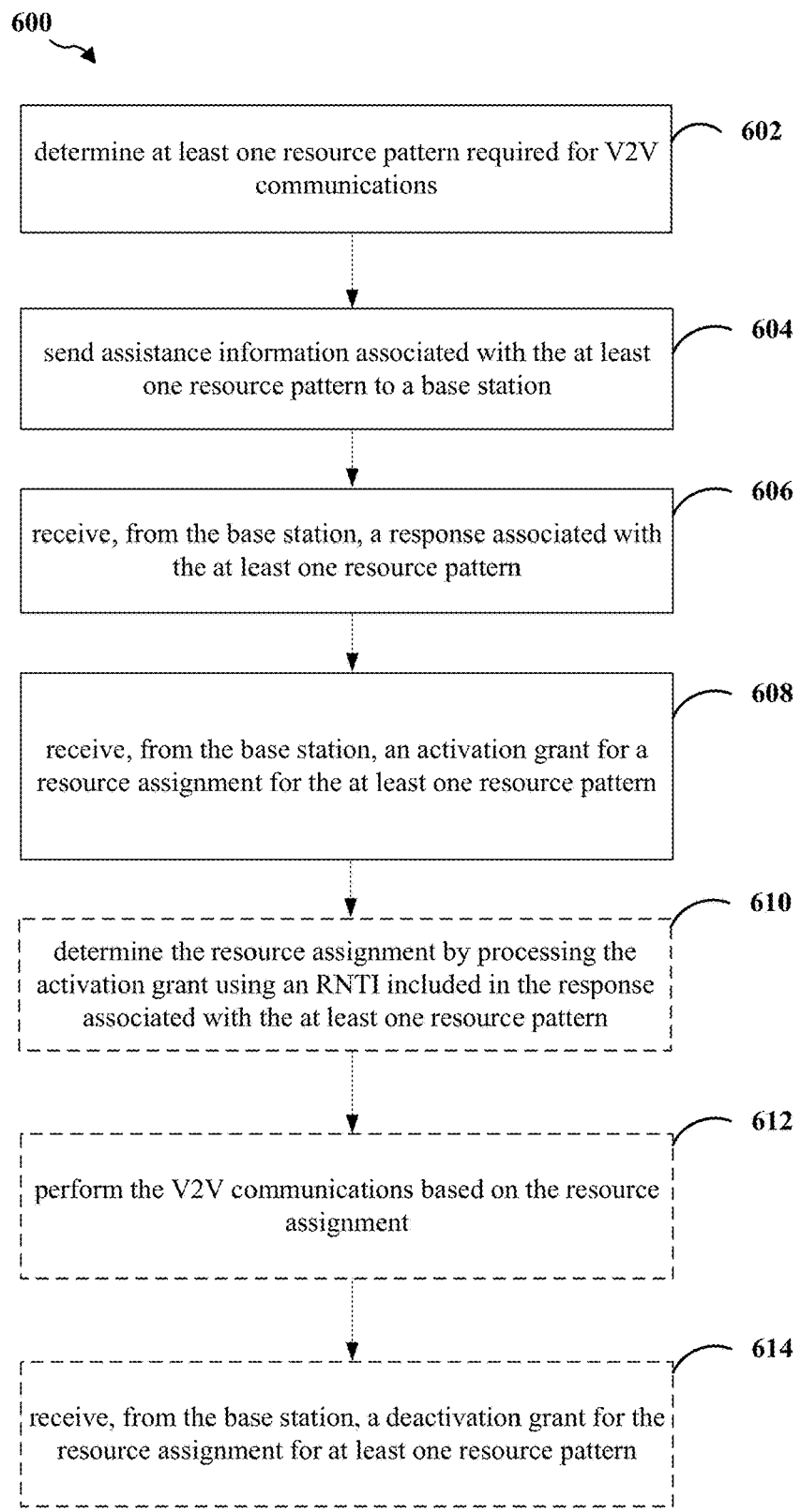
FIG. 6 is a flowchart of a method of wireless communication.

FIG. 6 is a flowchart 600 of a method of wireless communication. The method may be performed by a UE (e.g., the vehicle 512, the apparatus 702/702'). It should be understood that the operations indicated with dashed lines represent optional operations for various aspects of the disclosure.

At 602, the UE may determine at least one resource pattern required for V2V communications. In an aspect, the at least one resource pattern may include a plurality of resource patterns. In another aspect, each resource pattern of the plurality of resource patterns may be associated with a distinct V2V communication. For example, referring to FIG. 5, before communicating with vehicles 506, 508, 510, vehicle 512 may determine 530 at least one resource pattern required for one or more V2V communications 528. In an aspect, the at least one resource pattern may include a plurality of resource patterns, and each resource pattern of the plurality of resource patterns is associated with a distinct V2V communication.

At 604, the UE may send assistance information for the at least one resource pattern to a base station. In an aspect, the assistance information may be included in an SPS request. In another aspect, assistance information may include information associated with one or more of a target range for the V2V communications, a power of the V2V communications, a periodicity of the resource pattern required for the V2V communications, a latency in the V2V communication, a transmission type associated with the V2V communications, a resource offset with respect to a SFN, or a length of time that the resource pattern is required. In a further aspect, the assistance information may be sent in a control element of a MAC header or an RRC message. In yet another aspect, the sending the assistance information associated with the at least one resource pattern may include sending a plurality of individual transmissions, each one of the plurality of individual transmissions being associated with a different resource pattern. Further still, the sending the assistance information associated with the at least one resource pattern may include sending a single transmission that includes information associated with a different resource pattern. For example, referring to FIG. 5, the vehicle 512 may send an SPS request 520 that includes UE assistance information to the base station 504 in an attempt to obtain a resource assignment for at least one resource pattern for use in V2V communications. The UE assistance information may include information associated with a periodicity and/or timing for the at least one resource pattern. In an exemplary embodiment, the SPS request 520 may be used to obtain an SPS resource assignment. For example, the SPS request 520 and/or assistance information may include multiple fields that specify (e.g., to the base station 504) a requested resource period for the SPS resource assignment, a size of the V2V communication 528 to be broadcast using the SPS resource assignment, the power with which the V2V communication 528 will be broadcast using the SPS resource assignment, the type of V2V communication 528 being broadcast using the SPS resource assignment, a latency between when vehicle 512 intends to broadcast V2V communications 528 and when vehicle 512 is able to broadcast V2V communications 528 using the assigned SPS resource, and/or a resource offset needed for the SPS resource assignment of System Frame Number (SFN). In an aspect, the resource offset may allow for lower transmission latency between when the vehicle 512 intends to broadcast the V2V communication 528 and when vehicle 512 is able to broadcast the V2V communication 528. In an aspect, the SPS request 520 may be sent to the base station 504 over a control element in a MAC header or an RRC request message.

At 606, the UE may receive, from the base station, a response associated with the at least one resource pattern, the response comprising an index of approved resource patterns. In an aspect, the response associated with the at least one resource pattern may be received in an RRC grant. For example, referring to FIG. 5, the base station 504 can transmit a response 522 that can include one or more of an index of the approved resource patterns, a RNTI, and/or a resource period for each of the approved resource patterns. For example, the RNTI may be a V2V SPS RNTI that is specific to the SPS request(s) 520 transmitted by vehicle 512. After receiving the SPS request 520 from vehicle 512, the base station 504 may determine 540 the resource assignment for the SPS request(s) 520 after considering the various requirements specified in the fields of SPS request(s) 520 and/or the UE assistance information. In an aspect, base station 504 may configure multiple SPS configurations (e.g., a different SPS configuration for each SPS request 520) for the vehicle 512 based on the UE assistance information. For example, when the base station 504 activates multiple SPS configurations, the SPS configurations and UE assistance information may be linked to one or more radio bearers. Each of the multiple SPS-configurations may include different parameters (e.g., MCS and/or periodicity). For example, a specific SPS-configuration-specific MCS (e.g., if MCS is part of the SPS-configuration) and SPS-configuration-specific periodicity may be configured by the base station 504 using the UE assistance information. Alternatively, the base station 504 may activate a single SPS configuration at a time (e.g., as per LTE). In an aspect, response 522 may be transmitted by the base station 504 in an RRC grant. The RRC grant may indicate a periodicity for each SPS request 520 (e.g., with the corresponding index reference associated with each SPS request), a duration the resource assignment be made available every period once SPS resource allocation is activated.

At 608, the UE may receive, from the base station, an activation grant for a resource assignment for the at least one resource pattern. In an aspect, the activation grant may include the index of approved resource patterns being activated. In another aspect, the activation grant may be received in a DCI grant. For example, referring again to FIG. 5, to activate the SPS resource allocation, the base station 504 may transmit an activation grant 524 to vehicle 512. In an exemplary embodiment, the activation grant 524 may be transmitted as a DCI grant in the PDCCH. In an aspect, the DCI grant may be a DCI Format 5 (i.e., DCI5) grant that is scrambled with the V2V SPS RNTI to be distinguished by vehicle 512 from other types of grants. The DCI grant may indicate a duration the resource pattern will be made available once SPS is activated.

At 610, the UE may determine the resource assignment by processing the activation grant using an RNTI included in the response associated with the at least one resource pattern. For example, referring to FIG. 5, once the DCI grant is received, vehicle 512 may process 550 the DCI grant using the RNTI received in the RRC grant. In an exemplary embodiment, vehicle 512 may process 550 the DCI grant by descrambling the DCI grant using the V2V SPS RNTI received in the RRC grant.

At 612, the UE may perform the V2V communications based on the resource assignment. For example, referring to FIG. 5, once the DCI grant is descrambled vehicle 512 may begin broadcasting V2V communications 528 based on the resource assignment until the deactivation grant 526 is received.

At 614, the UE may receive, from the base station, a deactivation grant for the resource assignment for the at least one resource pattern. In an aspect, the deactivation grant may include an index of resource patterns being deactivated. In another aspect, the deactivation grant may be received in a DCI grant. For example, referring again to FIG. 5, the base station 504 may deactivate the SPS resource allocation by sending a deactivation grant 526 to vehicle 512. In an exemplary embodiment, the deactivation grant 526 may be transmitted as a DCI grant. In an exemplary embodiment, the deactivation grant may be scrambled with the V2V SPS RNTI to be distinguished by vehicle 512 from other types of grants. In an aspect, the deactivation grant 526 may include an index of the SPS requests and/or resource patterns that are being deactivated. Vehicle 512 may process 550 the deactivation grant 526 using the V2V SPS RNTI received in the RRC grant, and stop broadcasting the V2V communications 528 when the deactivation grant 526 is received.

Figure 7:
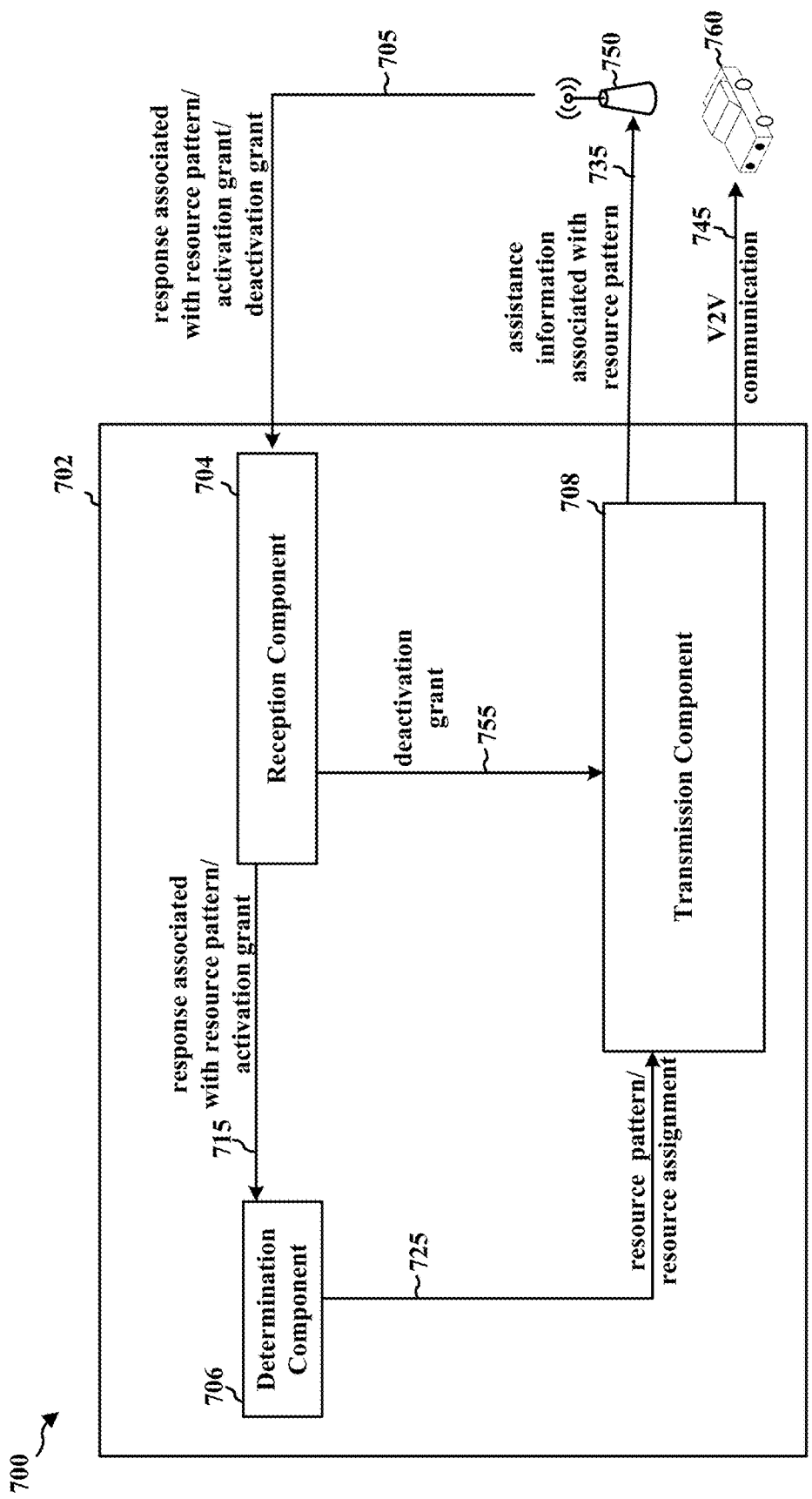
FIG. 7 is a conceptual data flow diagram illustrating the data flow between different means/components in an exemplary apparatus.

FIG. 7 is a conceptual data flow diagram 700 illustrating the data flow between different means/components in an exemplary apparatus 702. The apparatus may be a vehicle that is in communication with base station 750 and/or vehicle 760. The apparatus includes a determination component 706 that determines at least one resource pattern required for V2V communications. In an aspect, the determination component 706 may send a signal 725 associated with the resource pattern for V2V communications to the transmission component 708. The transmission component 708 may transmit assistance information 735 associated with the resource pattern for V2V communication to the base station 750. The reception component 704 may receive a response 705 associated with the resource pattern that includes an RNTI and/or an index of approved resource patterns from the base station 750. In addition, the reception component 704 may receive an activation grant 705 that includes an index of the approved resource patterns being activated from the base station 750. The reception component 704 may send a signal 715 associated with one or more of the response to the resource pattern and/or the activation grant to the determination component 706. The determination component 706 may determine the resource assignment by processing the activation grant using the RNTI included in the response to the resource pattern. The determination component 706 may send a signal 725 associated with the resource assignment to the transmission component 708. The transmission component 708 may transmit V2V communications 745 to the vehicle 760 using the resource assignment. The reception component 704 may also receive a deactivation grant 705 from the base station 750. In an aspect, the deactivation grant 705 deactivates one or more resource assignments. The reception component 704 may transmit a signal 755 associated with the deactivation grant 755 to the transmission component 708. The transmission component 708 may stop V2V communications with the vehicle 760 based on the deactivation grant.

The apparatus may include additional components that perform each of the blocks of the algorithm in the aforementioned flowchart of FIG. 6. As such, each block in the aforementioned flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
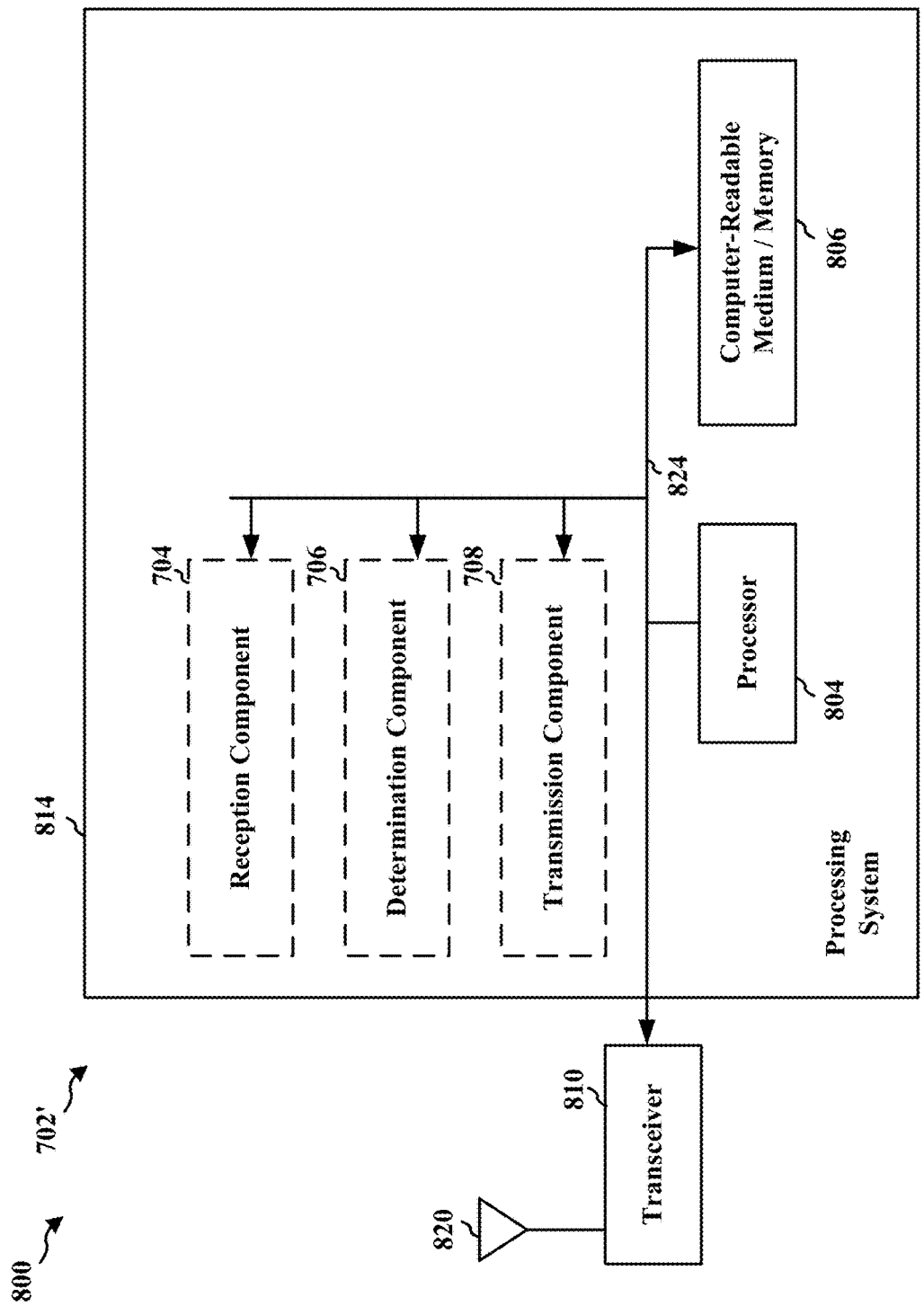
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 708, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708. The components may be software components running in the processor 804, resident/stored in the computer readable medium/memory 806, one or more hardware components coupled to the processor 804, or some combination thereof. The processing system 814 may be a component of the UE 350 and may include the memory 360 and/or at least one of the TX processor 368, the RX processor 356, and the controller/processor 359.

In one configuration, the apparatus 702/702' for wireless communication includes means for means for determining at least one resource pattern required for V2V communications. In an aspect, the at least one resource pattern may include a plurality of resource patterns. In another aspect, each resource pattern of the plurality of resource patterns may be associated with a distinct V2V communication. In another configuration, the apparatus 702/702' for wireless communication includes means for sending assistance information associated with the at least one resource pattern to a base station. In one aspect, the means for sending the assistance information associated with the at least one resource pattern may be configured to send a plurality of individual transmissions. For example, each one of the plurality of individual transmissions may be associated with a different resource pattern. In another aspect, the means for sending the assistance information associated with the at least one resource pattern may be configured to send a single transmission associated with a different resource pattern. In still another aspect, the assistance information may be an SPS request. For example, the assistance information may include information associated with one or more of a target range for the V2V communications, a power of the V2V communications, a periodicity of the resource pattern required for the V2V communications, a latency in the V2V communication, a transmission type associated with the V2V communications, a resource offset with respect to a SFN, or a length of time that the resource pattern is required. In another aspect, the assistance information may be sent in a control element of a MAC header or an RRC message. In a further configuration, the apparatus 702/702' for wireless communication includes means for receiving, from the base station, a response associated with the at least one resource pattern. For example, the response may include an index of approved resource patterns. In an aspect, the response associated with the at least one resource pattern may be received in an RRC grant. In yet another configuration, the apparatus 702/702' for wireless communication includes means for receiving, from the base station, an activation grant for a resource assignment for the at least one resource pattern. For example, the activation grant may include the index of approved resource patterns. In an aspect, the activation grant may be received in a DCI grant. In yet a further configuration, the apparatus 702/702' for wireless communication includes means for determining the resource assignment by processing the activation grant using a RNTI included in the response associated with the at least one resource pattern. In a further configuration, the apparatus 702/702' for wireless communication includes means for performing the V2V communications based on the resource assignment. In another configuration, the apparatus 702/702' for wireless communication includes means for receiving, from the base station, a deactivation grant associated with the at least one resource pattern that deactivates the resource assignment, the deactivation grant comprising an index of deactivated resource patterns. In an aspect, one or more of the activation grant or the deactivation grant may be received in a DCI grant.

The aforementioned means may be one or more of the aforementioned components of the apparatus 702 and/or the processing system 814 of the apparatus 702' configured to perform the functions recited by the aforementioned means. As described supra, the processing system 814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
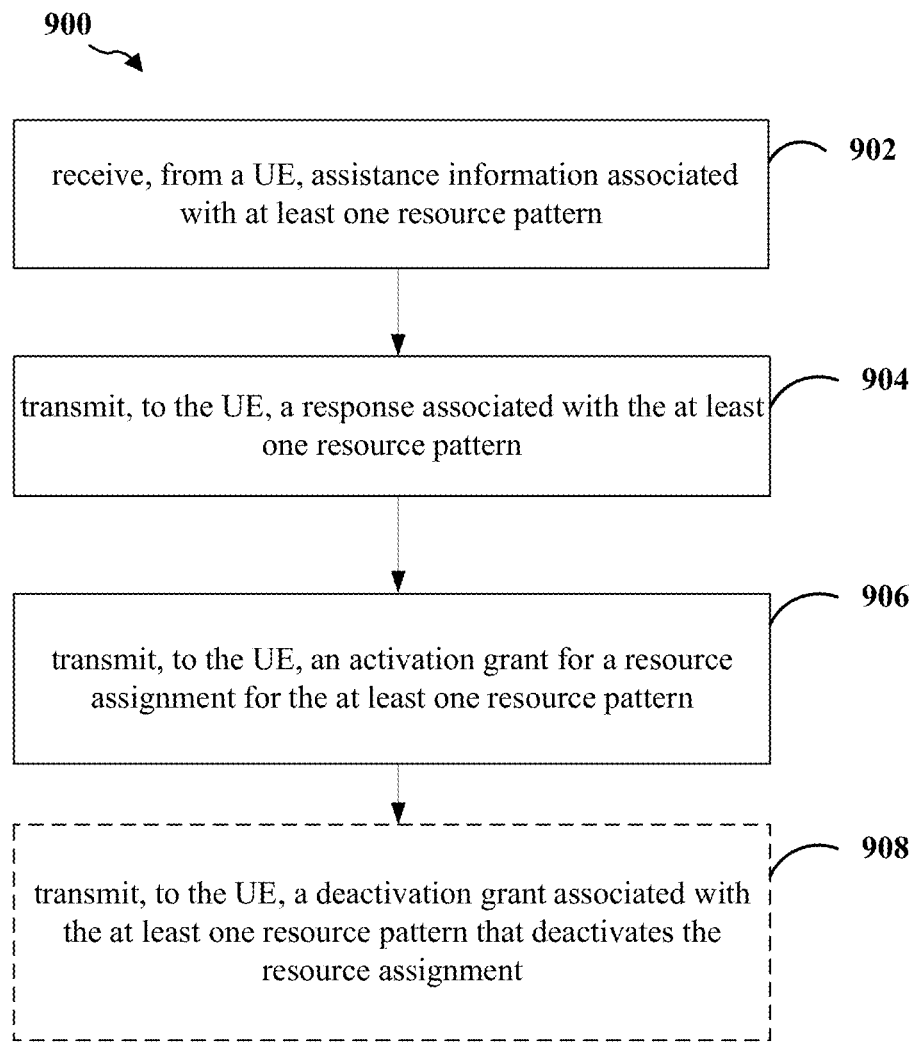
FIG. 9 is a flowchart of a method of wireless communication.

FIG. 9 is a flowchart 900 of a method of wireless communication. The method may be performed by a base station (e.g., the base station 504, the apparatus 1002/1002'). It should be understood that the operations indicated with dashed lines represent optional operations for various aspects of the disclosure.

At step 902, the base station may receive, from a UE, assistance information for at least one resource pattern. In an aspect, the assistance information may include information associated with at least one resource pattern required for V2V communications. In another aspect, the assistance information is included in an SPS request. For example, the assistance information may include information associated with one or more of a target range for the V2V communications, a power of the V2V communications, a periodicity of the resource pattern required for the V2V communications, a latency in the V2V communication, a transmission type associated with the V2V communications, a resource offset with respect to a SFN, or a length of time that the resource pattern is required. In another aspect, the assistance information may be received in a control element of a MAC header or an RRC message. In still a further aspect, the at least one resource pattern may include a plurality of resource patterns. Each resource pattern of the plurality of resource patterns may be associated with a distinct V2V communication. In yet another aspect, the receiving the assistance information associated with the at least one resource pattern may include receiving a plurality of individual transmissions. Each one of the plurality of individual transmissions may be associated with one of the plurality of resource patterns. Alternatively, the receiving the assistance information associated with the at least one resource pattern may include receiving a single transmission associated with a different resource pattern. For example, referring to FIG. 5, the vehicle 512 may send an SPS request 520 that includes UE assistance information to the base station 504 in an attempt to obtain a resource assignment for at least one resource pattern for use in V2V communications. The UE assistance information may include information associated with a periodicity and/or timing for the at least one resource pattern. In an exemplary embodiment, the SPS request 520 may be used to obtain an SPS resource assignment. For example, the SPS request 520 and/or assistance information may include multiple fields that specify (e.g., to the base station 504) a requested resource period for the SPS resource assignment, a size of the V2V communication 528 to be broadcast using the SPS resource assignment, the power with which the V2V communication 528 will be broadcast using the SPS resource assignment, the type of V2V communication 528 being broadcast using the SPS resource assignment, a latency between when vehicle 512 intends to broadcast V2V communications 528 and when vehicle 512 is able to broadcast V2V communications 528 using the assigned SPS resource, and/or a resource offset needed for the SPS resource assignment of System Frame Number (SFN). In an aspect, the resource offset may allow for lower transmission latency between when the vehicle 512 intends to broadcast the V2V communication 528 and when vehicle 512 is able to broadcast the V2V communication 528. In an aspect, the SPS request 520 may be sent to the base station 504 over a control element in a MAC header or an RRC request message.

At 904, the base station may transmit, to the UE, a response associated with the at least one resource pattern. In an aspect, the response may include an index of approved resource patterns. In a further aspect, the response associated with the at least one resource pattern may be transmitted in an RRC grant. In yet another aspect, the response associated with the at least one resource pattern may include an RNTI. For example, referring to FIG. 5, the base station 504 may transmit a response 522 that includes one or more of an index of the approved resource patterns, an RNTI, and/or a resource period for each of the approved resource patterns. For example, the RNTI may be a V2V SPS RNTI that is specific to the SPS request(s) 520 transmitted by vehicle 512. In an aspect, response 522 may be transmitted by the base station in an RRC grant. The RRC grant may indicate a periodicity for each SPS request 520 (e.g., with the corresponding index reference associated with each SPS request), and a duration the resources may be made available every period once SPS resource allocation is activated.

At 906, the base station may transmit, to the UE, an activation grant for a resource assignment for the at least one resource pattern. In an aspect, the activation grant may include the index of approved resource patterns being activated. In another aspect, the activation grant may be transmitted in a DCI grant. For example, referring again to FIG. 5, to activate the SPS resource allocation, the base station 504 can transmit an activation grant 524 to vehicle 512. In an exemplary embodiment, the activation grant 524 may be transmitted as a DCI grant in the PDCCH. In an aspect, the DCI grant may be a DCI Format 5 (i.e., DCI5) grant that is scrambled with the V2V SPS RNTI to be distinguished by vehicle 512 from other types of grants. The DCI grant may indicate a duration the resource pattern will be made available once SPS is activated.

At 908, the base station may transmit, to the UE, a deactivation grant for the resource assignment for at least one resource pattern. In an aspect, the deactivation grant may include an index of resource patterns being deactivated. In another aspect, the deactivation grant may be transmitted in a DCI grant. For example, referring to FIG. 5, the base station 504 may deactivate the SPS resource allocation by sending a deactivation grant 526 to vehicle 512. In an exemplary embodiment, the deactivation grant 526 may be transmitted as a DCI grant. In an exemplary embodiment, the deactivation grant may be scrambled with the V2V SPS RNTI to be distinguished by vehicle 512 from other types of grants. In an aspect, the deactivation grant 526 may include an index of the SPS requests that are being deactivated. Vehicle 512 can process 550 the deactivation grant 526 using the V2V SPS RNTI received in the RRC grant, and stop broadcasting the V2V communications 528 when the deactivation grant 526 is received.

Figure 10:
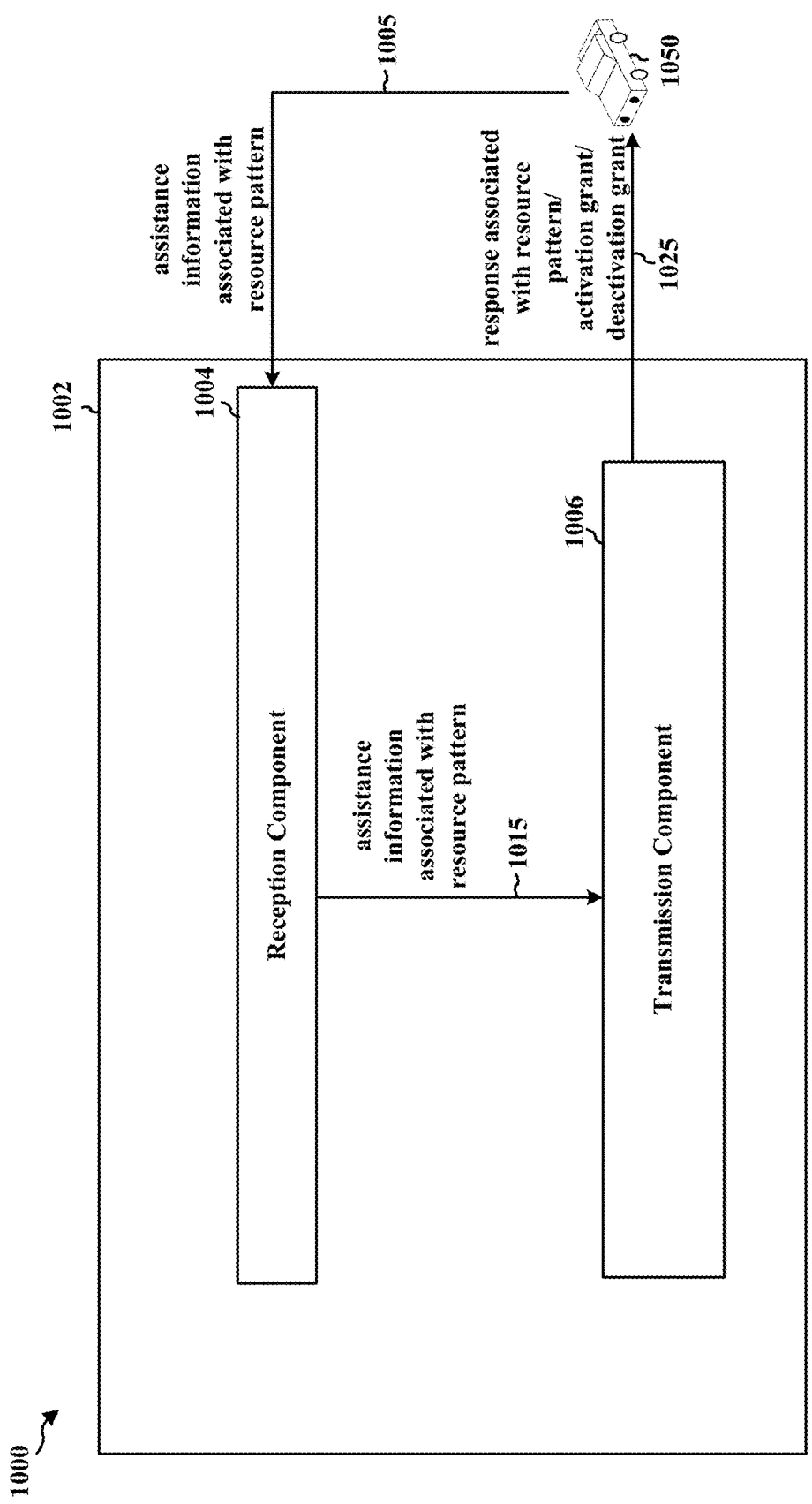
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus may be a base station. The apparatus includes a reception component 1004 that may receive a assistance information 1005 associated with a resource pattern from vehicle 1050. The reception component 1004 may send a signal 1015 associated with the assistance information associated with the resource pattern to transmission component 1006. The transmission component 1006 may transmit a response 1025 to the at least one resource pattern. For example, the response to the at least one resource pattern may include an RNTI and/or an index of approved resource patterns. In addition, the transmission component 1006 may transmit an activation grant 1025 to the vehicle. For example, the activation grant 1025 may include the index of approved resource patterns. Still further, the transmission component 1006 may transmit a deactivation grant 1025 to the vehicle 1050.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
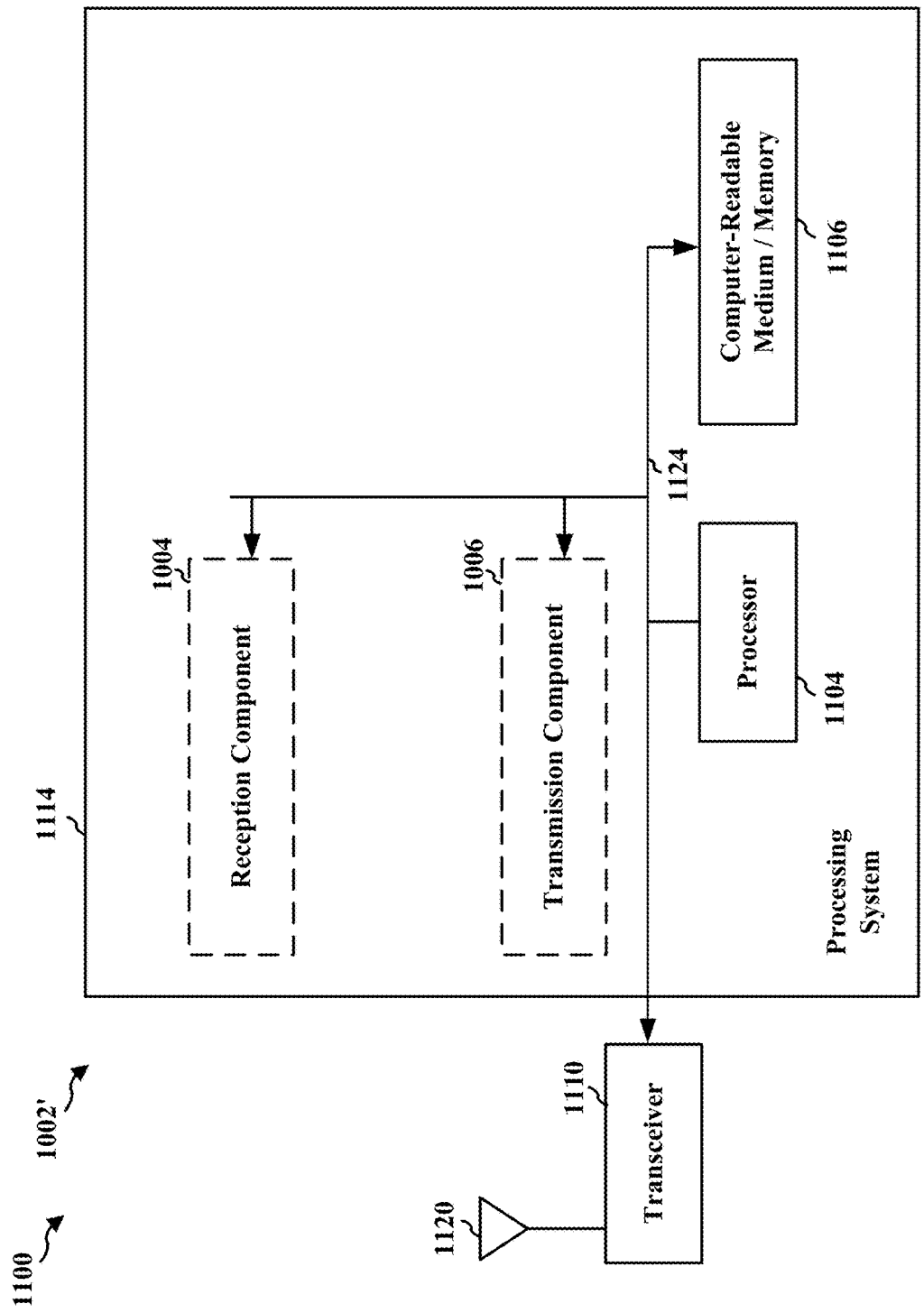
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1006, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006. The components may be software components running in the processor 1104, resident/stored in the computer readable medium/memory 1106, one or more hardware components coupled to the processor 1104, or some combination thereof. The processing system 1114 may be a component of the eNB 310 and may include the memory 376 and/or at least one of the TX processor 316, the RX processor 370, and the controller/processor 375.

In one configuration, the apparatus 1002/1002' for wireless communication includes means for receiving, from UE, assistance information associated with at least one resource pattern. In an aspect, the assistance information may include information associated with at least one resource pattern required for V2V communications. In another aspect, the assistance information may be included in a SPS request. For example, the assistance information may include information associated with one or more of a target range for the V2V communications, a power of the V2V communications, a periodicity of the resource pattern required for the V2V communications, a latency in the V2V communication, a transmission type associated with the V2V communications, a resource offset with respect to a SFN, or a length of time that the resource pattern is required. In another aspect, the assistance information may be received in a control element of a MAC header or an RRC message. In another aspect, the at least one resource pattern may include a plurality of resource patterns. For example, each resource pattern of the plurality of resource patterns may be associated with a distinct V2V communication. In another aspect, the means for receiving the assistance information associated with the at least one resource pattern may be configured to receive a plurality of individual transmissions, each one of the plurality of individual transmissions being associated with one of the plurality of resource patterns. In a further aspect, the means for receiving the assistance information associated with the at least one resource pattern may be configured to receive a single transmission that includes information associated with a different resource pattern. In another configuration, the apparatus 1002/1002' for wireless communication includes means for transmitting, to the UE, a response associated with the at least one resource pattern. In one aspect, the response may include an index of approved resource patterns. In another aspect, the response associated with the at least one resource pattern may be transmitted in an RRC grant. In a further configuration, the response associated with the at least one resource pattern includes a RNTI. In a further configuration, the apparatus 1002/1002' for wireless communication includes means for transmitting, to the UE, an activation grant for a resource assignment for the at least one resource pattern. In an aspect, the activation grant may include the index of approved resource patterns. In another aspect, the activation grant may be transmitted in a DCI grant. In yet another aspect, the apparatus 1002/1002' for wireless communication includes means for transmitting, to the UE, a deactivation grant associated with the assistance information that deactivates the resource assignment. In an aspect, the deactivation grant may include an index of deactivated resource patterns. In an aspect, one or more of the activation grant or the deactivation grant is transmitted in a DCI grant. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), the method comprising:
   determining a plurality of resource patterns required for vehicle-to-vehicle (V2V) communications prior to obtaining an activation grant for a resource assignment for the V2V communications from a base station;
   sending a semi-persistent schedule (SPS) request including assistance information, the assistance information associated with the plurality of resource patterns to the base station, wherein each resource pattern of the plurality of resource patterns is associated with a distinct V2V communication from the UE;
   receiving, from the base station, a response associated with at least one resource pattern of the plurality of resource patterns, the response comprising an index of approved resource patterns; and
   receiving, from the base station, the activation grant for the resource assignment for the at least one resource pattern, the activation grant comprising the index of approved resource patterns.

2. The method of claim 1, wherein the assistance information includes information associated with one or more of a target range for the V2V communications, a power of the V2V communications, a periodicity of the at least one resource pattern required for the V2V communications, a latency in the V2V communication, a transmission type associated with the V2V communications, a resource offset with respect to a System Frame Number (SFN), or a length of time that the at least one resource pattern is required.

3. The method of claim 1, wherein:
the assistance information is sent in a control element of a medium access control (MAC) header or a radio resource control (RRC) message;
the response associated with the at least one resource pattern is received in an RRC grant; and
the activation grant is received in a data channel information (DCI) grant.

4. The method of claim 1, wherein the sending the assistance information associated with the plurality of resource patterns comprises sending a plurality of individual transmissions, each one of the plurality of individual transmissions being associated with a different resource pattern.

5. The method of claim 1, wherein the sending the assistance information associated with the plurality of resource patterns comprises sending a single transmission associated with the plurality of resource patterns.

6. The method of claim 1, further comprising performing the V2V communications based on the resource assignment.

7. The method of claim 1, further comprising receiving, from the base station, a deactivation grant associated with the at least one resource pattern that deactivates the resource assignment, the deactivation grant comprising an index of deactivated resource patterns.

8. The method of claim 7, wherein one or more of the activation grant or the deactivation grant is received in a downlink control information (DCI) grant.

9. The method of claim 1, further comprising determining the resource assignment by processing the activation grant using a radio network temporary identifier (RNTI) included in the response associated with the at least one resource pattern.

10. An apparatus for wireless communication, comprising:
a memory; and
at least one processor coupled to the memory and configured to:
determine a plurality of resource patterns required for vehicle-to-vehicle (V2V) communications prior to obtaining an activation grant for a resource assignment for the V2V communications from a base station;
send a semi-persistent schedule (SPS) request including assistance information, the assistance information associated with the plurality of resource patterns to the base station, wherein each resource pattern of the plurality of resource patterns is associated with a distinct V2V communication from a user equipment (UE);
receive, from the base station, a response associated with at least one resource pattern of the plurality of resource patterns, the response comprising an index of approved resource patterns; and
receive, from the base station, the activation grant for the resource assignment for the at least one resource pattern, the activation grant comprising the index of approved resource patterns.

11. The apparatus of claim 10, wherein the assistance information includes one or more of a target range for the V2V communications, a power of the V2V communications, a periodicity of the at least one resource pattern required for the V2V communications, a latency in the V2V communication, a transmission type associated with the V2V communications, a resource offset with respect to a System Frame Number (SFN), or a length of time that the at least one resource pattern is required.

12. The apparatus of claim 10, wherein:
the assistance information is sent in a control element of a medium access control (MAC) header or a radio resource control (RRC) message;
the response associated with the assistance information is received in an RRC grant; and
the activation grant is received in a data channel information (DCI) grant.

13. The apparatus of claim 10, wherein the at least one processor is configured to send the assistance information associated with the plurality of resource patterns by sending a plurality of individual transmissions, each one of the plurality of individual transmissions being associated with a different resource pattern.

14. The apparatus of claim 10, wherein the at least one processor is configured to send the assistance information associated with the plurality of resource patterns by sending a single transmission associated with the plurality of resource patterns.

15. The apparatus of claim 10, wherein the at least one processor is further configured to perform the V2V communications based on the resource assignment.

16. The apparatus of claim 10, wherein the at least one processor is further configured to receive, from the base station, a deactivation grant associated with the at least one resource pattern that deactivates the resource assignment, the deactivation grant comprising an index of deactivated resource patterns.

17. The apparatus of claim 16, wherein one or more of the activation grant or the deactivation grant is received in a downlink control information (DCI) grant.

18. The apparatus of claim 10, wherein the at least one processor is further configured to determine the resource assignment by processing the activation grant using a radio network temporary identifier (RNTI) included in the response associated with the at least one resource pattern.

19. An apparatus for wireless communication, comprising:
means for determining a plurality of resource patterns required for vehicle-to-vehicle (V2V) communications prior to obtaining an activation grant for a resource assignment for the V2V communications from a base station;
means for sending a semi-persistent schedule (SPS) request including assistance information, the assistance information associated with the plurality of resource patterns to the base station, wherein each resource pattern of the plurality of resource patterns is associated with a distinct V2V communication from a user equipment (UE);
means for receiving, from the base station, a response associated with at least one resource pattern of the plurality of resource patterns, the response comprising an index of approved resource patterns; and
means for receiving, from the base station, the activation grant for the resource assignment for the at least one resource pattern, the activation grant comprising the index of approved resource patterns.

20. The apparatus of claim 19, wherein the assistance information includes information associated with one or more of a target range for the V2V communications, a power of the V2V communications, a periodicity of the at least one resource pattern required for the V2V communications, a latency in the V2V communication, a transmission type associated with the V2V communications, a resource offset with respect to a System Frame Number (SFN), or a length of time that the at least one resource pattern is required.

21. The apparatus of claim 19, wherein:
the assistance information is sent in a control element of a medium access control (MAC) header or a radio resource control (RRC) message;
the response associated with the assistance information is received in an RRC grant; and
the activation grant is received in a data channel information (DCI) grant.

22. The apparatus of claim 19, wherein the means for sending the assistance information associated with the plurality of resource patterns is configured to send a plurality of individual transmissions, each one of the plurality of individual transmissions being associated with a different resource pattern.

23. The apparatus of claim 19, wherein the means for sending the assistance information associated with the plurality of resource patterns is configured to send a single transmission that includes information associated with the plurality of resource patterns.

24. A computer-readable medium storing computer executable code, comprising code to:

determine a plurality of resource patterns required for vehicle-to-vehicle (V2V) communications prior to obtaining an activation grant for a resource assignment for the V2V communications from a base station;

sending a semi-persistent schedule (SPS) request including assistance information, the assistance information associated with the plurality of resource patterns to the base station, wherein each resource pattern of the plurality of resource patterns is associated with a distinct V2V communication from a user equipment (UE);

receive, from the base station, a response associated with at least one resource pattern of the plurality of resource patterns, the response comprising an index of approved resource patterns; and receive, from the base station, the activation grant for the resource assignment for the at least one resource pattern, the activation grant comprising the index of approved resource patterns.

* * * * *